United States Patent [11] 3,565,331

[72] Inventors Ronald Campbell McIntosh
St. Albans;
Hayden Victor Purdy, London, England
[21] Appl. No. 702,041
[22] Filed Jan. 31, 1968
[45] Patented Feb. 23, 1971
[73] Assignee Purdy & McIntosh (Electronic Developments) Limited
London, England
[32] Priority Feb. 6, 1967
[33] Great Britain
[31] 5642/67

[54] METHODS OF AND APPARATUS FOR RECORDING INFORMATION ON A TAPE-FORM RECORDING MEDIUM

5 Claims, 2 Drawing Figs.

[52] U.S. Cl. .......... 234/4, 234/23, 235/61.1
[51] Int. Cl. .......... G06k 1/00, G06k 1/04, G06k 15/00
[50] Field of Search .......... 235/61.11, 61.1; 234/6, 4

[56] References Cited
UNITED STATES PATENTS

| | | | |
|---|---|---|---|
| 1,219,766 | 3/1917 | Peirce .......... | 235/61.1 |
| 3,339,470 | 9/1967 | O'Brien et al. .......... | 234/4X |

*Primary Examiner*—Daryl W. Cook
*Assistant Examiner*—Thomas J. Sloyan
*Attorney*—Young & Thompson

ABSTRACT: The invention provides apparatus for amending code signals on a tape form record medium, for example punched paper tape. The apparatus reads information already recorded on the record medium, recognizes places where amendment is required and makes the necessary amendment. The invention is also concerned with a combined reading and recording head for punched paper tape having a reading portion arranged to sense perforations in some of the channels and a tape punch to make additional perforations in the other channels.

INVENTORS
RONALD CAMPBELL McINTOSH
HAYDEN VICTOR PURDY
BY Young & Thompson
ATTYS.

INVENTORS
RONALD CAMPBELL McINTOSH
HAYDEN VICTOR PURDY
BY Young & Thompson
ATTYS.

METHODS OF AND APPARATUS FOR RECORDING INFORMATION ON A TAPE-FORM RECORDING MEDIUM

This invention relates to the recording of information on an elongated tape-form medium, for example, a punched paper tape, and is more particularly concerned with the problem of amending the information already recorded on the tapelike medium. A particular, although by no means exclusive, application of the invention is to the generation of a paper tape record of alphanumeric text intended ultimately for printing in justified columns.

It is frequently necessary in connection with punched tape procedure to amend information already recorded on the tape, for instance, in sorting routines and in editing. Such amendment is normally accomplished by reading the already recorded tape record under the control of a special modification programme and simultaneously (or substantially simultaneously) reperforating the coded information in a new tape with such additional coded records as may be necessary. In the particular case of an alphanumeric text for printing purposes, the magnitude of the interword space between each word in a line which is necessary to produce the required right hand justification, is not known until all the alphanumeric characters have been recorded on the tape.

According to one aspect of the invention, a combined reading and recording unit for operation with the tape-form record medium comprises a reading head adapted to sense information recorded on part of a tape-form record medium and a recording head for effecting further recording on a part of such record medium which is not sensed by the reading head.

The invention will be more readily understood from the following detailed description with reference to the accompanying drawings, in which.

Figure 1:
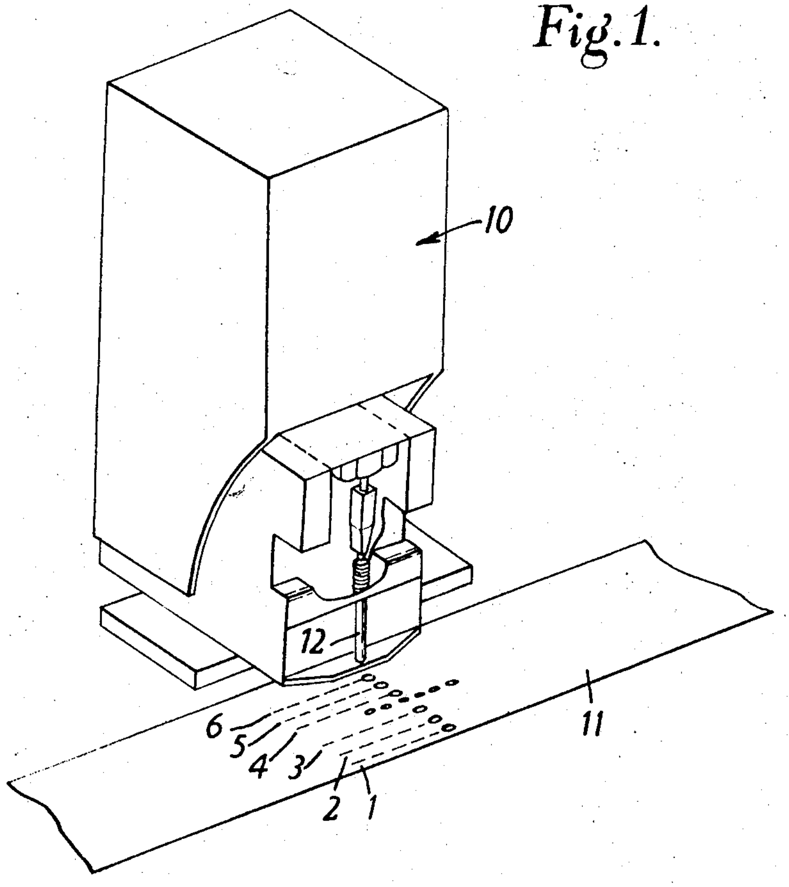
FIG. 1 is a partially broken-away isometric view of a reading head having an integral punch for use with punched paper tape.

FIG. 1 illustrates a reading head 10 for use with a punched paper tape record 11, the reading head includes sensing means (not shown) operative in five channels 1 to 5 of the tape, and a punch 12 which is operative in channel 6.

The invention will be described in its application to the control of slug casting machines.

When setting up type for printing, after each line has been set up it is necessary to adjust the spacing between individual words so that adjacent lines of type have the same length and the right-hand margin is uniform. This process is called "right-hand justification." In slug casting machines, where individual pieces of type are set up and then used as a mould from which a complete slug is cast, it is customary to insert an adjustable so called a "spaceband" wedge between each word. During the setting up of the line, the spacebands are set to their minimum width and a fresh line is started when there is insufficient space at the end of the precious line to accommodate the next word. After a line of type has been set up, all the spacebands therein are expanded uniformly until the line has the required overall length. It may happen that, even with all the spacebands set to their maximum width, the line is still too short. In this case, it is necessary to add a so called "thin space" of fixed width between each word, prior to the adjustment of the spaceband wedges.

When a slug casting machine is arranged to be controlled by a punch paper tape, the punch operator, when producing the tape, punches a symbol between each word to indicate that a spaceband should be added. Means are provided for indicating to the operator, at the end of each line, whether the spacebands will be sufficient to increase the length of the line to be required value or whether thin spaces will be necessary. If thin spaces are necessary, the already punched tape must be amended so as to indicate that, whenever in the previous line a spaceband was to be added, a thin space must also be added. In order to facilitate this, where a six bit coded format is used, the binary value 4 (indicated by a single hole in channel 3) indicates that a spaceband should be inserted and binary value 32 (a single hole in channel 6) indicates that a thin space should be added. Thus, where thin spaces are to be added at a position where spacebands have already been called for, the existing binary value 4 on the tape can be overpunched by binary value 32 to produce the total value 36. This total value 36 is read at the caster as an order to insert both a thin space and a spaceband wedge. It is difficult and time consuming to overpunch each of the existing "Spaceband" (binary 4) codes by adding additional "Add thin space" (binary 32) punchings when preparing the original tape because the operator discovers the need for such overpunching only when nearing the line-end. To do so he must then backspace, possibly to near the beginning of the line, in order to amend the tape.

It is already known in connection with the use of a reperforating device operated by a reader which reads the original tape record backwards, to arrange for the punching of an instruction code, usually binary value 40, signifying "Add thins to all spaces in this line" followed by the normal line-end code sequence of "return" (binary value 2) and "Elevate" (binary value 8). Such known systems employ both a reader and a punch to produce a new tape.

Figure 2:
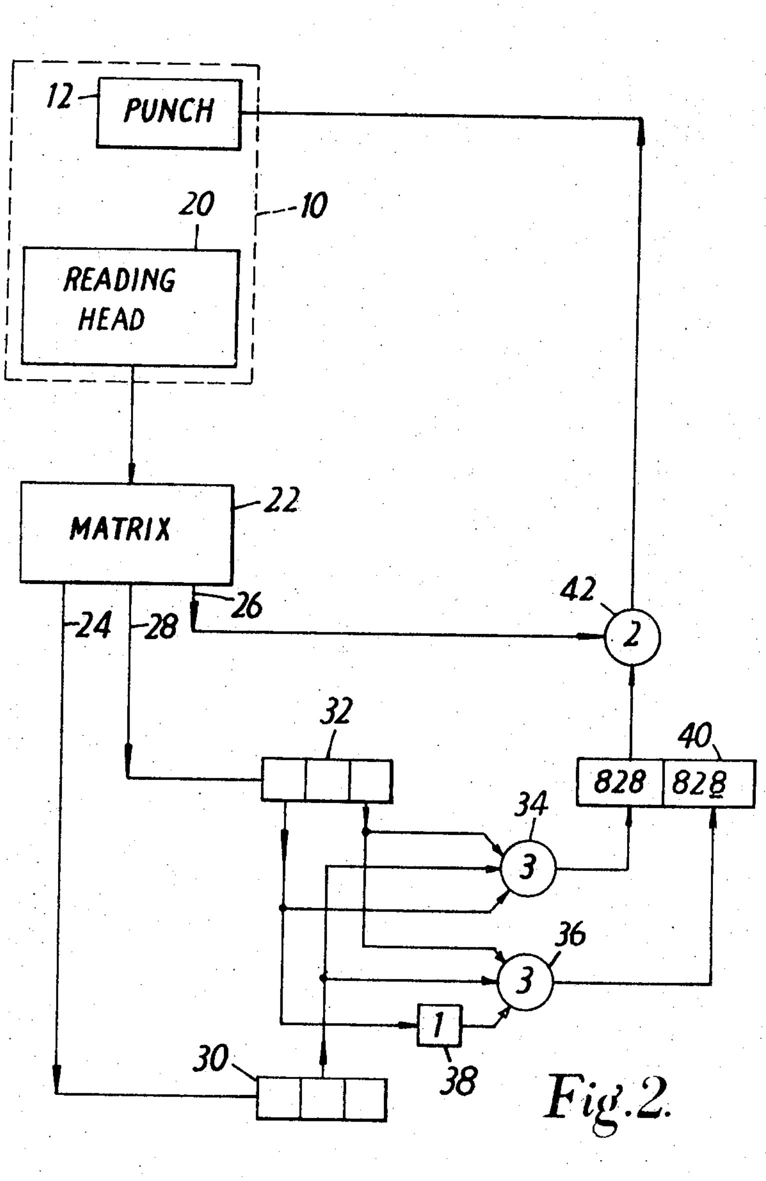
FIG. 2 is a schematic diagram illustrating an application of the invention employing the reading head shown in FIG. 1.

By means of the reader-punch arrangement of the reading head according to the invention, however, the consequent processing of the tape carrying the function code "Add thins to all spaces" may be greatly simplified. Referring to FIG. 2, five channels only (binary values 1, 2, 4, 8 and 16) are read by the reading head 20 and the single channel punch 12 is arranged to operate in the sixth channel (binary value 32). The output of the reading head 20 is connected to a decoding matrix 22, which has a separate output for each binary value which could be detected by the reading head 20, i.e. binary values 0 to 31. The matrix produces a first signal condition on a respective output when the corresponding binary value is received and a second signal condition when such binary value is not received. For the purpose of controlling the insertion of thins, it is only necessary to detect binary values 2, 4 and 8; output leads 24, 26 and 28 respectively are connected to these outputs. Output leads 24 and 28 are connected to the input of respective three-stage shift registers 30 and 32. The outputs from the second stage of the shift register 30 and from the first and third stages of the shift register 32 are connected to respective inputs of a first three-input AND gate 34. The outputs from the second stage of the shift register 30 and the third stage of the shift register 32 are also connected respectively to two of the inputs of a second three-input AND gate 36. The output from the first stage of the shift register 32 is connected to the third input of the second AND gate 36 via an inverter 38. The outputs of the AND gate 34 and 36 are connected to the set and reset inputs respectively of a toggle or flip-flop 40. The set output of the toggle 40 is connected to one input of a two input AND gate 42 the other input of which is connected to the output lead 26 of the decoding matrix 22. The output of the AND gate 42 is connected to the punch 12 to control operation thereof.

The operation of the system will now be described. When preparing the punched tapes, the operator decides at the end of each line whether or not it will be necessary to insert thins in the spaces in such lines. If he decides that thins are necessary, he punches the following sequence of signals:

"Add thins to all spaces in this line" (binary value 40)
"Return" (binary value 2)
"Elevate" (binary value 8)

On the other hand, if he decides that thins are not required, he omits the "Add thins" operation and merely punches.

"Return" (binary value 2)
"Elevate" (binary value 8)

When such a tape is fed backwards through the tape reader 10, the reading head 20 first senses the "Elevate" signal then the "Return" signal and then, if it is present, the "Add thins" signal. However, since the reading head is operative on five channels only, it detects "Add thins" signal (binary value 40)

as if it were a repeat of the "Elevate" (binary value 8). Consequently, if thins are to be inserted in a particular line, the reading head 20 will detect the sequence 8-2-8 prior to scanning the line and if thins are not to be inserted the sequence will be 8-2-3.

If the sequence 8-2-8 is received, the content of shift register 30 will be 010 and that of shift register 32 will be 101. Consequently the AND gate 34 is open and the toggle 40 is left in the set condition. Thus, during subsequent reading of the line, as each "Spaceband" code (binary value 4) is sensed, the AND gate 42 opens and the punch 12 operates changing the "Spaceband" code (binary value 4) to the "Spaceband plus thin" code (binary value 36).

On the other hand if the sequence 8-2-3 is detected by the reading head 20, at the end of the sequence, the contents of the shift register 30 will be 010 and that of the shift register 32 (reading from the right in FIG. 2) will be 100. Consequently the AND gate 36 will be open and the toggle 40 left in the rest state. Thus the AND gate 42 will remain closed during subsequent detection of the "Spaceband" code (binary value 4) and the punch 12 will not operate. Thus the line is not amended.

It should be noted that the present of more than one successive "Elevate" code (binary value 8), which would be required if a wide space is to be left between successive lines, will not interfere with the operation of the system for controlling the addition of thins provided the operator always punches the "Return" code (binary value 2) before punching an "Elevate" code (binary value 8).

A code other than binary value 40 may be chosen to represent "Add thins" but it must of course neither interfere with a subsequent machine function nor be liable to erroneous generation. One way of making such a code available is to remove an unimportant character from the caster magazine. Other embodiments of the invention can be conceived. For example, with a tape which has already been punched with a code employing a six bit format, the reading head of the tape reader 10 may be arranged to sense all six bits and the auxiliary punch 12 to operate in a seventh, provided that the paper tape is wide enough to accommodate such additional channel.

This modified arrangement may be used to insert on a paper tape carrying continuous alphanumeric copy, instructions for dividing such copy into lines. The tape is advanced through the reading head while the existing code functions therein are interrupted by an associated character-width and interword space calculator. Forward movement is maintained until each line of the required paper set just over fills to become what is known as a "tight line".

The tape is then backspaced to the nearest interword space. Parallel to this frame a hole is then punched in the seventh channel 1 by means of the punch 12 acting under the control of suitable simple control logic circuitry. This hole can be regarded as a timing bit to indicate the start of a serial code instruction which is now punched by means of the same punch 12 in the vacant seventh channel, one bit per frame, while reading of the original coded information relative to the subsequent line length block of characters proceeds by normal means by movement of the tape in a forward direction. The inserted serial code instruction may define the required space alterations needed to achieve appropriate justification of the line of type eventually set.

The serial code punching in the seventh channel may consist, in one particular form of the invention, of one bit only signifying a multiple instruction to a hot metal slug casting machine to "ignore space band code" and "insert return and elevate codes at this point". In such a case special control functions would be necessary at the slug casting read-in station.

The inserted serial code instruction will normally be of a fixed length, but it may be of any length which does not exceed the minimum length of the block of codes serving to define a type line in the eventual type.

For use in film setter control, the inserted serial code may represent a binary number signifying the increment which is to be added to the interword spaces in the type line.

A single bit may be chosen to cause the subsequent insertion of a hyphen, the instruction being punched in channel 7 in response to a control either by automatic hyphenation logic forming part of the associated equipment or manually by an attendant after inspection of the coded and/or the printed out record of the line end situation, the tape being previously stopped as a result of arrangements operative when the interword space dimension is not within the chosen justification tolerance.

While the invention has been particular described with relation to its use with punched tape control of alphanumeric type setting, it will be clear that it has much wider application and that the basic idea may be applied to a tapelike record medium which does not employ hole punchings for recording purposes. For example, the tape medium may use visible markings for cooperation with photoelectric reading devices or even magnetic or electrostatic recordings on an appropriate base material.

We claim:

1. Apparatus for modifying code signals on a tape-form record medium, comprising a combined reading and recording unit for operation with a tape-form record medium having a reading head adapted to sense information recorded on said record medium and a recording head for effecting further recording on a part of said record medium not sensed by the reading head, detector means for recognizing first and second predetermined sequences of code signals, storage means arranged responsive to said detector means, to take up a first state when said first predetermined sequence of code signals is recognized and to take up a second state when said second predetermined sequence of code signals is recognized and gating means responsive to said storage means and operative, when said storage means is in its first condition, to allow said reading head to cause said recording head to modify a predetermined code signal on a tape-form record medium on recognition of such code signal by said reading head, said gating means being operative to inhibit such modification when said storage means is in its second condition.

2. Apparatus as claimed in claim 1, in which the detector means comprises a decoding matrix connected to the reading head and having a respective output for each digit value occurring in the sequences and a respective shift register for each digit value occurring in the sequences, having as many stages as there are code digits in the sequences and connected to a respective output in the sequences and connected to a respective output of the matrix whereby, at the end of a sequence, the contents of each shift register from a pattern corresponding to the occurrence of its respective digit value in the sequence and a respective AND gate for each sequence having an input for each digit in the sequence, each input being connected to a respective shift register stage, directly if the presence of the corresponding digit value is characteristic of the sequence and via an inverter if the absence of the corresponding digit value is characteristic of the sequence.

3. An apparatus as claimed in claim 2, in which the storage means is a toggle.

4. Apparatus as claimed in claim 1, for use with a record medium carrying alphanumeric copy which is to be set up in tape in which the first and second sequences are sequences one or other of which occurs at the end of each line and the predetermined code signal is the signal representing an interword space.

5. Apparatus as claimed in claim 1, for use with a record medium carrying continuous alphanumeric copy which is to be set up in type, in which the circuit arrangements are operative to determine the last word which can be accommodated in each line of type and the magnitude of the interword spaces in such line.